United States Patent Office 3,390,112
Patented June 25, 1968

3,390,112
VINYL HALIDE RESINS STABILIZED WITH MIXTURES COMPRISING POLYOLS, PHENOLS AND BARIUM AND CADMIUM SALTS
James P. Scullin, Pompton Lakes, and Arthur F. Fletcher, Elizabeth, N.J., assignors, by mesne assignments, to Tenneco Chemicals, Inc., a corporation of Delaware
No Drawing. Filed July 3, 1963, Ser. No. 292,722
20 Claims. (Cl. 260—23)

This invention relates to stabilizers for halogen-containing resins and to the resinous compositions stabilized therewith.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resins show little or no tendency to plate-out during processing. Plate-out is the result of the separation of one or more ingredients, usually pigments and stabilizers, from a vinyl halide resin composition during the various stages of its processing and the deposition of these materials onto the metal surfaces of the processing equipment. These deposits on the metal surfaces may cause streaking or spotting of the finished products. They may also interfere with sheet transfer from roll to roll or with the removal of the product from the mold, thereby reducing the rate of production. To be useful commercially, the compositions should also have good color, clarity, and light stability.

A number of compounds and combinations of compounds have been suggested for use as stabilizers in vinyl halide resins. While some of these impart heat stability to the resins and others reduce their tendency to plate-out, none have previously been disclosed that will impart to the resinous composition the desired combination of heat and light stability, clarity, resistance to plate-out, and other valuable properties.

It is therefore an object of the present invention to provide stabilizers which when added to a vinyl halide resin will protect the resin from thermal degradation for a prolonged period of time.

It is a further object to provide vinyl halide resin compositions that are stabilized against the deteriorative effects of heat and light.

It is still another object of the invention to provide stabilized halogen-containing resins of unusual clarity that have little tendency to plate-out.

Other objects and advantages of the present invention will be apparent from the detailed disclosure that follows.

In accordance with the present invention it has been found that vinyl halide resins that have excellent heat and light stability, clarity, color, resistance to plate-out, and other valuable properties are obtained by using a stabilizer that contains (a) a mixture of barium and cadmium salts including at least one salt having an aromatic anion and at least one salt having an aliphatic anion, (b) a phenolic compound, and (c) a polyhydric alcohol component that is pentaerythritol, sorbitol, mannitol, methyl glucoside, a polymeric polyhydric alcohol, or a mixture thereof.

In order to obtain stabilized resin compositions having the desired heat and light stability, color, and clarity, it is necessary that the stabilizer contain at least one barium salt and at least one cadmium salt and that a salt of one of these metals have an aromatic anion and a salt of the other metal have an aliphatic anion. It is generally preferred that the stabilizer contain a cadmium salt having an aromatic anion and barium salt having an aliphatic anion. If desired, other salts of these metals may also be present.

The aliphatic compounds from which the metal salts may be derived are saturated and unsaturated monocarboxylic acids containing from 2 to 22 carbon atoms. Particularly advantageous results have been obtained using salts of fatty acids containing from 6 to 18 carbon atoms, for example, caproic acid, caprylic acid, 2-ethylhexanoic acid, pelargonic acid, lauric acid, myristic acid, palmitic acid, stearic acid, oleic acid, and linoleic acid, or from naturally-occurring mixtures of these acids, such as tallow fatty acids, coconut oil fatty acids, tall oil fatty acids, soybean oil fatty acids, cottonseed oil fatty acids, and the like.

The aromatic compounds from which the metal salts may be derived include aromatic monocarboxylic acids and alkylene bisphenols. Suitable aromatic monocarboxylic acids are benzoic acid and substituted benzoic acids in which the substituents are halogen atoms or alkyl groups containing not more than 8 carbon atoms. Illustrative of these substituted benzoic acids are toluic acids, xylic acids, ethylbenzoic acids, isopropylbenzoic acids, p-tert. butylbenzoic acid, di-tert. butylbenzoic acid, octylbenzoic acid, chlorobenzoic acids, and bromobenzoic acid. The alkylene bis phenols that may be used in the preparation of the salts include, for example, 2,2-bis (4-hydroxyphenyl) propane, 4,4'-methylene bis (2-methyl-6-tert. butylphenol), 2,2'-methylene bis (4,6-dimethylphenol), 2,2'-butylidene bis (4,6-dimethylphenol), and 4,4'-butylidene bis (3-methyl-6-tert. butylphenol).

The phenolic compounds that can be used in the stabilizer mixtures include a wide variety of monohydric and polyhydric phenols. The monohydric phenols are substituted phenolic compounds in which the substituents are halogen atoms, alkyl groups, aryl groups, nitro groups, amino groups, carboxyl groups, carbalkoxy groups, and the like. A preferred group of monohydric phenols are alkylphenols having the formula

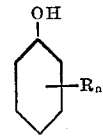

wherein R represents an alkyl group having from 1 to 8 carbon atoms and $n$ represents a number in the range of 1 to 3. Illustrative of these monohydric phenols are the following: cresols, xylenols, carvacol, thymol, butylphenols, octylphenols, chlorophenols, bromophenols, butylcresols, p-hydroxybenzoic acid, salicylic acid, chlorosalicylic acids, salicylaldehyde, lower alkyl esters of p-hydroxybenzoic acid, lower alkyl esters of salicylic acid, aryl esters of salicylic acid, and alkylphenylphenols.

The polyhydric phenols include both polynuclear phenols and those phenols that have two or more hydroxyl groups attached to a single aromatic nucleus. A preferred group of polyhydric phenols are polynuclear phenols that have the formula

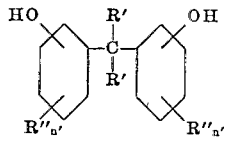

wherein each R' represents a hydrogen atom or a lower alkyl group, R" represents a lower alkyl group or a halogen atom, and $n'$ represents a number in the range of 0 to 3. Illustrative of the useful polyhydric phenols are the following: resorcinol, alkylresorcinols, catechol, hydroquinone, orcinol, hydroxyhydroquinone, hexahydrobenzene, 2,2 - bis (4-hydroxyphenyl) propane, 2,2-bis (4-hydroxydichlorophenyl) propane, 2,2-bis (4-hydroxyphenyl) butane, 4,4' - dihydroxybenzophenone, 4,4'-dihydroxybiphenyl, 1,5-dihydroxynaphthalene, 2,2'-methylene bis (4-methyl-6-tert. butylphenol), 4,4'-methylene bis (2,6 - di-tert. butylphenol), 2,2'-butylidene bis (4,6-dimethylphenol), 4,4' - butylidene bis (3-methyl-6-tert. butylphenol), 4,4'-thiobis (3-methyl-6-tert. butylphenol), 2,2' - dihydroxy-3,3',5,5'-tetramethylstilbene, methylene bis (β-naphthol), methylene bis (salicylic acid), 2,2'-isopropylidene bis (4-methyl-6-tert. butylphenol), N-salicoyl-p-aminophenol, and the like. A single phenol or a mixture of two or more phenols may be used in the stabilized compositions.

The polyhydric alcohols that can be used in the practice of this invention include pentaerythritol, sorbitol, mannitol, and methyl glucoside. Also useful are the polymeric alcohols that have the formula

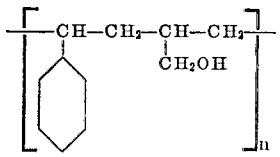

wherein $n$ represents a number in the range of 5 to 10. One such polymeric alcohol, which has a molecular weight of approximately 1150, is marketed as Resinous Polyol X–450. Since their use results in resinous compositions having the best thermal stability and clarity, pentaerythritol and sorbitol are the preferred polyhydric alcohols for use in the stabilizers of the present invention. The use of other polyhydric alcohols, such as trimethylolethane, trimethylolpropane, and dipentaerythritol, in the stabilizers results in stabilized compositions that do not have the required heat stability and clarity.

Th stabilizer compositions of the present invention in most cases contain approximately 20 parts to 40 parts by weight of the barium salt, 45 to 65 parts by weight of the cadmium salt, 5 parts to 15 parts by weight of the phenolic compound, and 5 parts to 15 parts by weight of the polyhydric alcohol with the amount of each largely dependent upon the properties desired in the stabilized resin.

In addition to the novel stabilizers, the stabilized vinyl halide compostions may also contain other heat and light stabilizers including, for example, organic phosphites and epoxidized oils. The useful phosphites include trialkyl phosphites, triaryl phosphites, and alkyl aryl phosphites. Illustrative of these phosphites are triphenyl phosphite, tri (p-tert. butylphenyl) phosphite, diphenyl monobutyl phosphite, diphenyl monooctyl phosphite, monophenyl di-2-ethylhexyl phosphite, di-p-tert. octylphenyl monohexyl phosphite, and tridecyl phosphite. The preferred epoxidized oils are epoxidized soybean oil and epoxidized tall oil fatty acids esters.

Only a small amount of the stabilizer need be present in the vinyl halide resin compositions of the present invention. It has been found that as little as 1% of the stabilizer, based on the weight of the composition, will bring about an appreciable improvement in the heat and light stability of the composition. Approximately 10% or more of the stabilizer can be used, but these larger amounts generally do not provide further improvement in the properties of the resinous composition and for this reason are not ordinarily used. While the amount of the stabilizer that will provide optimum heat and light stability depends upon such factors as the choice of stabilizer components and the choice of vinyl halide resin, in most cases approximately 2% to 6% of the stabilizer, based on the weight of the vinyl halide resin composition, is used.

The vinyl halide polymers that may be employed in the compositions of this invention are the resinous products obtained by the polymerization of a vinyl halide in the presence or absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70% of vinyl halide and up to 30% of the comonomer. The invention is also applicable to mixtures of polyvinyl chloride in a major proportion with a minor proportion of other synthetic resins, such as chlorinated polyethylene, polyacrylate and polymethacrylate esters, and copolymers of acrylonitrile, butadiene, and styrene.

The invention is of particular value in the stabilization of rigid polyvinyl chloride compositions, that is, compositions which are formulated to withstand temperatures of at least 350° F. The stabilizer systems of this invention can also be used with plasticized vinyl halide resin compositions of conventional formulation where high softening point is not a requisite. Any of the well-known plasticizers for vinyl halide resins can be used including dioctyl phthalate, dibutyl sebacate, tricresyl phosphate, and octyl diphenyl phosphate.

In addition to the ingredients described, the stabilized resinous compositions may contain other resin additives, such as pigments, extenders, solvents, and dyes, in the amounts ordinarily employed for the purposes indicated.

The stabilized vinyl halide resin compositions may be prepared by any convenient procedure. It is generally preferred to blend the stabilizer with the vinyl halide resin using plastic mixing rolls at a temperature at which the mix is fluid and to mill the composition on a two-roll mill at from 300° F. to 400° F. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

This invention is further illustrated by the examples that follow. It is to be understood, however, that these examples are given solely for the purpose of illustration and that the invention is not to be regarded as being limited to any of the specific materials or conditions recited therein except as set forth in the appended claims.

Example 1

To 100 parts by weight of a vinyl chloride homopolymer (Geon 103 EP) was added 3 parts by weight of one of the stabilizers of the present invention. The resulting mixture was blended at room temperature and then charged to a two-roll, steam-heated, differential speed mill whose surface temperature was maintained at 350° F. The mixture was milled for 5 minutes and then removed from the rolls as a sheet 0.045 inch in thickness.

Each of the stabilizers used contained 25% by weight of barium myristate, 59% by weight of cadmium benzoate, 8% by weight of a phenolic compound, and 8% by weight of a polyhydric alcohol. Stabilizers containing the following phenolic compounds and polyhydric alcohols were used:

| | Phenolic Compound | Polyhydric Alcohol |
|---|---|---|
| Stabilizer: | | |
| A | 2,2-bis (4-hydroxyphenyl) propane | Pentek powder.[1] |
| B | do | Sorbitol. |
| C | do | Methyl glucoside. |
| D | do | Resinous polyol X-450. |
| E | do | Mannitol. |
| F | 4,4'-thiobis (3-methyl-6-tert. butylphenol) | Pentek powder.[1] |
| G | Phenyl salicylate | Do.[1] |
| H | p-Tert. octylphenol | Do.[1] |
| I | Propyl p-hydroxybenzoate | Do.[1] |
| J | Salicylic acid | Do.[1] |

[1] Technical grade of pentaerythritol.

For comparative purposes compositions were prepared that contained the following stabilizers:

| | Stabilizer Components |
|---|---|
| Comparative Stabilizer: | |
| 1 | 25% Barium myristate. 59% Cadmium benzoate. 8% 2,2-bis (4-hydroxyphenyl) propane. 8% Trimethylolpropane. |
| 2 | 25% Barium myristate. 59% Cadmium benzoate. 8% 2,2-bis (4-hydroxyphenyl) propane. 8% Dipentaerythritol. |
| 3 | 25% Barium myristate. 59% Cadmium benzoate. 8% Phenyl salicylate. 8% Trimethylolpropane. |
| 4 | 35% Barium laurate. 49% Cadmium laurate. 8% p-Tert. octylphenol. 8% Pentek powder. |

The heat stability ratings of the compositions containing these stabilizers were determined by placing 1 x 1 inch specimens which had been cut from the milled sheets in a forced-circulation air oven at 350° F. and removing specimens periodically until degradation was complete as judged by color change. The heat stability ratings of the compositions containing Stabilizers A–J and Comparative Stabilizers 1–4 are given in Table I. A numerical scale is used to indicate the color of the samples, with a rating of 0 denoting absence of color, 1 denoting light yellow, 2 denoting yellow, 3 denoting dark yellow, 4 denoting light tan, 5 denoting tan, 6 denoting brown, and 7 denoting black.

The clarity of cast films of these compositions is also indicated in this table.

TABLE I

| | Color After Indicated Number of Minutes at 350° F. | | | | | | | | | | Clarity of Cast Film of Composition |
|---|---|---|---|---|---|---|---|---|---|---|---|
| | 15 | 30 | 45 | 60 | 75 | 90 | 105 | 120 | 135 | 150 | |
| Stabilizer: | | | | | | | | | | | |
| A | 1 | 1 | 1 | 1 | 2 | 2 | 2 | 4 | 4 | 5 | Clear. |
| B | 1 | 1 | 1 | 2 | 2 | 2 | 4 | 5 | 5 | 5 | V. Sl. Cloudy. |
| C | 1 | 2 | 2 | 4 | 4 | 4 | 5 | 5 | 6 | 6 | Clear. |
| D | 1 | 1 | 2 | 4 | 4 | 4 | 5 | 5 | 6 | 6 | Sl. Cloudy. |
| E | 1 | 1 | 1 | 2 | 2 | 4 | 4 | 5 | 6 | 6 | V. Sl. Cloudy. |
| F | 1 | 1 | 1 | 2 | 4 | 4 | 5 | 6 | 6 | 6 | Clear. |
| G | 1 | 1 | 1 | 2 | 4 | 4 | 5 | 6 | 6 | 7 | |
| H | 1 | 1 | 1 | 2 | 4 | 4 | 5 | 6 | 6 | 7 | |
| I | 1 | 1 | 1 | 2 | 4 | 4 | 5 | 6 | 6 | 7 | |
| J | 1 | 1 | 1 | 2 | 4 | 4 | 5 | 6 | 6 | 7 | |
| 1 | 1 | 2 | 2 | 4 | 5 | 5 | 6 | 6 | 7 | 7 | V. Sl. Cloudy. |
| 2 | 1 | 2 | 2 | 4 | 5 | 5 | 6 | 6 | 7 | 7 | Sl. Cloudy. |
| 3 | 1 | 2 | 2 | 4 | 5 | 5 | 6 | 6 | 7 | 7 | |
| 4 | 1 | 1 | 1 | 2 | 4 | 4 | 5 | 6 | 6 | 6 | Cloudy. |

Example 2

To 100 parts by weight of a vinyl chloride homopolymer (Geon 103 EP) was added 3 parts by weight of one of the stabilizers of this invention and 2 parts by weight of monoisooctyl diphenyl phosphite. The resulting mixture was blended at room temperature and then charged to a two-roll, steam-heated, differential speed mill whose surface temperature was maintained at 350° F. The mixture was milled for 5 minutes and then removed from the rolls as a sheet 0.045 inch in thickness. The stabilizers used are given in Table II. Also included in this table are the heat stability ratings of the stabilized compositions and the clarity ratings of cast films of the compositions.

TABLE II

| | Color After Indicated Number of Minutes at 350° F. | | | | | | | | | | Clarity of Cast Film of Composition |
|---|---|---|---|---|---|---|---|---|---|---|---|
| | 15 | 30 | 45 | 60 | 75 | 90 | 105 | 120 | 135 | 150 | |
| Stabilizer: | | | | | | | | | | | |
| A | 0 | 0 | 0 | 1 | 1 | 2 | 2 | 3 | 3 | 5 | V. Sl. Cloudy. |
| B | 0 | 0 | 0 | 1 | 1 | 2 | 2 | 3 | 3 | 5 | Clear. |
| 4 | 0 | 0 | 1 | 2 | 2 | 2 | 3 | 3 | 5 | 7 | Cloudy. |

Example 3

To 100 parts by weight of a vinyl chloride homopolymer (Geon 103 EP) were added 3 parts by weight of Stabilizer K which contained

| | Percent by weight |
|---|---|
| Barium myristate | 35.0 |
| Cadmium benzoate | 48.0 |
| Sorbitol | 8.5 |
| 2,2-bis (4-hydroxyphenyl) propane | 8.5 | and 2 parts by weight of monoisooctyl diphenyl phosphite. The resulting mixture was blended at room temperature and then charged to a two-roll, steam-heated, differential speed mill whose surface temperature was maintained at 350° F. The mixture was milled for 5 minutes and then removed from the rolls as a sheet 0.045 inch in thickness. The heat stability ratings of this composition and of a comparative composition are given in Table III.

TABLE III

| | Color After Indicated Number of Minutes at 350° F. | | | | | | | | | |
|---|---|---|---|---|---|---|---|---|---|---|
| | 15 | 30 | 45 | 60 | 75 | 90 | 105 | 120 | 135 | 150 |
| Stabilizer: | | | | | | | | | | |
| K | 0 | 0 | 0 | 1 | 1 | 2 | 2 | 3 | 3 | 5 |
| 4 | 0 | 0 | 1 | 2 | 2 | 2 | 3 | 3 | 5 | 7 |

From the data in Tables I to III it will be seen that the compositions containing the stabilizers of the present invention are more heat stable and in most cases clearer than were those containing the closely related comparative stabilizers.

Example 4

To 100 parts by weight of a vinyl chloride homopolymer (Geon 103 EP) was added 3 parts by weight of one of the stabilizers of the present invention and 0.3 part by weight of 2-hydroxy-4-methoxybenzophenone. The resulting mixture was blended at room temperature and then charged to a two-roll, steam-heated, differential speed mill whose surface temperature was maintained at 350° F. The mixture was milled for 5 minutes and then removed from the rolls as a sheet 0.045 inch in thickness.

The light stability of the compositions was determined by placing 1 x 1 inch specimens which had been cut from the milled sheet in an X–W Weather-Ometer and removing specimens periodically until degradation was complete as judged by color change. The light stability ratings of the compositions are given in Table IV.

TABLE IV

| Stabilizer: | Color After Indicated Number of Hours in Weather-Ometer | | | | | | |
|---|---|---|---|---|---|---|---|
| | 11 | 32 | 43 | 65 | 107 | 147 | 178 |
| A | 0 | 1 | 2 | 4 | 4 | 5 | 6 |
| B | 0 | 1 | 2 | 4 | 5 | 5 | 6 |
| G | 0 | 0 | 1 | 1 | 1 | 1 | 2 |
| 4 | 1 | 3 | 3 | 4 | 4 | 5 | 6 |

We claim:
1. A stabilizer for vinyl halide resin compositions which comprises (a) a mixture of barium and cadmium salts that contains at least one salt having an aromatic anion and at least one salt having an aliphatic anion; (b) a phenolic compound; and (c) a polyhydric alcohol selected from the group consisting of pentaerythritol, sorbitol, mannitol, methyl glucoside, compounds having the formula:

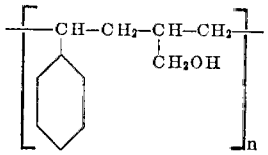

wherein $n$ represents a number in the range of 5 to 10, and mixtures thereof in the amounts of approximately 45 parts to 65 parts by weight of the barium salt, 45 parts to 65 parts by weight of the cadmium salt, 5 parts to 15 parts by weight of the phenolic compound, and 5 parts to 15 parts by weight of the polyhydric alcohol.

2. A stabilizer for vinyl halide resin compositions which comprises (a) approximately 45 parts to 65 parts by weight of cadmium benzoate, (b) approximately 20 parts to 40 parts by weight of a barium salt of fatty acids having from 6 to 18 carbon atoms, (c) approximatley 5 parts to 15 parts by weight of a phenolic compound, and (d) approximately 5 parts to 15 parts by weight of a polyhydric alcohol selected from the group consisting of pentaerythritol, sorbitol, mannitol, methyl glucoside, compounds having the formula:

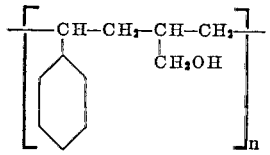

wherein $n$ represents a number in the range of 5 to 10, and mixtures thereof.

3. A stabilizer for vinyl halide resin compositions in accordance with claim 2 wherein the phenolic compound is 2,2-bis (4-hydroxyphenyl) propane.

4. A stabilizer for vinyl halide resin compositions in accordance with claim 2 wherein the phenolic compound is 4,4'-thiobis (3-methyl-6-tert. butylphenol).

5. A stabilizer for vinyl halide resin compositions in accordance with claim 2 wherein the phenolic compound is phenyl salicylate.

6. A stabilizer for vinyl halide resin compositions in accordance with claim 2 wherein the phenolic compound is salicylic acid.

7. A stabilizer for vinyl halide resin compositions in accordance with claim 2 wherein the phenolic compound is octylphenol.

8. A stabilizer for vinyl halide resin compositions in accordance with claim 2 wherein the polyhydric alcohol is pentaerythritol.

9. A stabilizer for vinyl halide resin compositions in accordance with claim 2 wherein the polyhydric alcohol is sorbitol.

10. A stabilizer for vinyl halide resin compositions in accordance with claim 2 wherein the polyhydric alcohol is mannitol.

11. A heat and light stable resinous composition comprising a vinyl halide resin and a heat stabilizing amount of a stabilizer comprising (a) a mixture of barium and cadmium salts that contains at least one salt having an aromatic anion and at least one salt having an aliphatic anion; (b) a phenolic compound; and (c) a polyhydric alcohol selected from the group consisting of pentaerythritol, sorbitol, mannitol, methyl glucoside, the compound having the formula

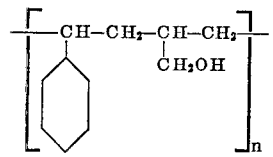

wherein $n$ represents a number in the range of 5 to 10, and mixtures thereof in the amounts of approximately 45 parts to 65 parts by weight of said cadmium salt, 20 parts to 40 parts by weight of said barium salt, 5 parts to 15 parts by weight of said phenolic compound, and 5 parts to 15 parts by weight of said polyhydric alcohol.

12. A heat and light stable resinous composition comprising polyvinyl chloride and approximately 2 parts to 6 parts by weight per 100 parts by weight of said polyvinyl chloride of a stabilizer comprising (a) approximately 45 parts to 65 parts by weight of cadmium benzoate, (b) approximately 20 parts to 40 parts by weight of a barium salt of fatty acids having from 6 to 18 carbon atoms, (c) approximately 5 parts to 15 parts by weight of a phenolic compound, and (d) approximately 5 parts to 15 parts by weight of a polyhydric alcohol selected from the group consisting of pentaerythritol, sorbitol, mannitol, methyl glucoside, the compound having the formula

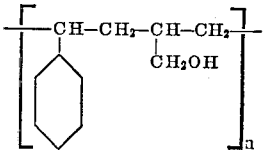

wherein $n$ represents a number in the range of 5 to 10, and mixtures thereof.

13. A heat stable resinous composition in accordance with claim 12 in which the phenolic compound is 2,2-bis (4-hydroxyphenyl) propane.

14. A heat stable resinous composition in accordance with claim 12 in which the phenolic compound is phenyl salicylate.

15. A heat stable resinous composition in accordance with claim 12 in which the phenolic compound is 4,4'-thiobis (2-methyl-6-tert. butylphenol).

16. A heat stable resinous composition in accordance with claim 12 in which the phenolic compound is octylphenol.

17. A heat stable resinous composition in accordance with claim 12 in which the phenolic compound is salicylic acid.

18. A heat stable resinous composition in accordance with claim 12 in which the polyhydric alcohol is pentaerythritol.

19. A heat stable resinous composition in accordance with claim 12 in which the polyhydric alcohol is sorbitol.

20. A heat stable resinous composition in accordance with claim 12 in which the polyhydric alcohol is mannitol.

(References on following page)

References Cited

UNITED STATES PATENTS

| | | | |
|---|---|---|---|
| 2,564,646 | 8/1951 | Leistner et al. | 260—23 |
| 2,652,521 | 1/1953 | Fischer et al. | 260—23 |
| 2,711,401 | 6/1955 | Lally | 260—45.75 |
| 2,837,490 | 6/1958 | Hecker | 260—23 |
| 2,889,295 | 6/1959 | Darby et al. | 260—23 |
| 2,919,259 | 12/1959 | Naylor et al. | 260—45.75 |
| 2,935,491 | 5/1960 | Mack | 260—45.75 |
| 2,943,070 | 6/1960 | Hecker et al. | 260—23 |
| 2,997,454 | 8/1961 | Leistner et al. | 260—23 X |
| 3,075,940 | 1/1963 | Pazinski et al. | 260—45.85 |
| 3,144,422 | 8/1964 | Homberg | 260—45.85 |
| 3,196,129 | 7/1965 | Hechenbleikner et al. | 260—45.75 |
| 2,590,059 | 3/1952 | Winkler | 260—23 X |

DONALD E. CZAJA, *Primary Examiner.*

LEON J. BERCOVITZ, *Examiner.*

R. A. WHITE, *Assistant Examiner.*